Nov. 23, 1926.　　　　　　　　　　　　　　　1,608,356
G. G. BELL
MICROMETER CALIPERS
Filed August 19, 1924

INVENTOR:
George Godfrey Bell
by Chas. H. Luther
ATTORNEY:

Patented Nov. 23, 1926.

1,608,356

UNITED STATES PATENT OFFICE.

GEORGE GODFREY BELL, OF PROVIDENCE, RHODE ISLAND.

MICROMETER CALIPERS.

Application filed August 19, 1924. Serial No. 732,986.

My invention has reference to an improvement in micrometer calipers and more particularly to an improvement in the sleeve or thimble of micrometer calipers.

In micrometer calipers in which the readings are given by lines and numerals, mistakes are liable to be made and are made at times, as such readings are at the best rather vague and indistinct.

The object of my invention is to improve the construction of a micrometer caliper having lines and numerals for giving the readings, whereby the readings are more quickly and positively seen than has heretofore been done.

A further object of my invention is to produce a more easy and positively reading micrometer caliper having lines and numerals at a minimum additional cost of manufacturing.

My invention consists in the peculiar and novel construction of the thimble of a micrometer caliper, said thimble having details of construction, as will be more fully set forth hereinafter and claimed.

Figure 3:
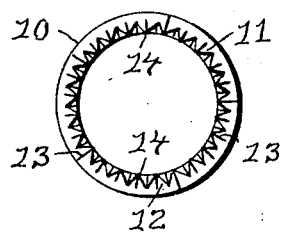
Figure 3 is an end view of the reading end of the barrel having my invention.
Figure 4:
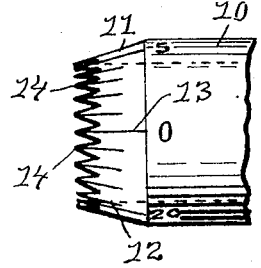
Figure 4 is a side view of the reading end of the barrel having my invention, the rest of the barrel being broken away.

In the drawing 5 indicates the frame of a micrometer caliper, 6 the anvil, 7 the spindle, 8 the barrel having the usual scale 9 consisting of the usual transverse lines and numerals, which divide one inch into forty parts each representing twenty five one thousandths of an inch. Secured to the spindle 7 is a thimble 10 having an inner bevelled end 11. On the inner end of the thimble is a scale 12 consisting of twenty five radial lines 13, 13, and adjacent numerals on the cylindrical portion of the thimble. In the preferred form I form the end of the bevelled end 11 into a series of saw-teeth 14, 14, one saw-tooth for each radial line 13, which extends centrally to the point of the saw-tooth, as shown in Figures 3 and 4.

Figure 1:
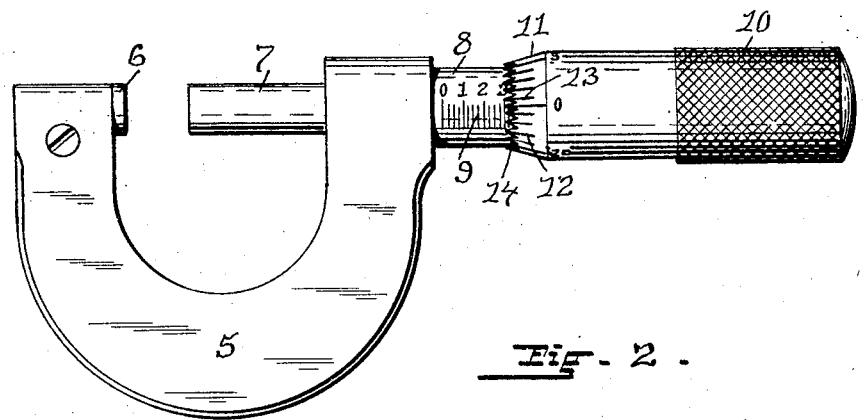
Figure 1 is a side view of a micrometer caliper the thimble of which is provided with my invention for easy reading.
Figure 2:
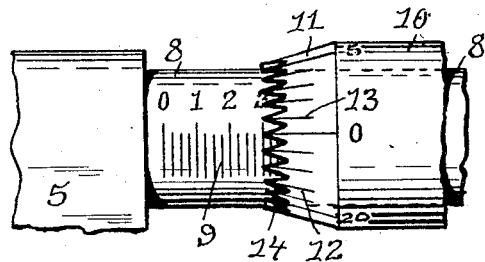
Figure 2 is an enlarged detail side view of part of the barrel and the reading end of the thimble provided with my invention.

The operation of measuring anything up to one inch is done by turning the thimble 10 as heretofore. When the required measurement is obtained this measurement or reading is given by the scales 9 and 12, and by the transverse lines of the scale 9 showing between the saw-teeth 14, 14. As shown in Figures 1 and 2, the reading is clearly, easily and more positively seen, than has heretofore been done.

Although I show the bevelled end of the thimble formed into saw-teeth as the preferred form I do not limit myself to this construction, as in place of the saw-teeth any form or shape of projections constructed to form spaces between the projections, could be used.

Having thus described my invention I claim as new:—

1. A thimble for a micrometer caliper having an inner tubular bevelled end and a series of projecting members on the bevelled end, all formed integral with the thimble, for the purpose as described.

2. A thimble for a micrometer caliper having an inner tubular bevelled end, and a series of saw-tooth shaped projections on the bevelled end, all formed integral with the thimble, for the purpose as described.

3. A micrometer caliper thimble having a tubular beveled end, a scale consisting of radial lines and numerals on the beveled end and a series of projecting members on the beveled end of the thimble, one projecting member for each radial line, for the purpose as described.

4. A micrometer caliper thimble having a tubular beveled end, radial lines and numerals on the beveled end forming a scale, and a series of saw-tooth shaped projecting members on the beveled end, one saw-toothed shaped projecting member for each radial line, the radial lines extending to the ends of the saw-tooth shaped members, for the purpose as described.

In testimony whereof, I have signed my name to this specification.

GEORGE GODFREY BELL.